United States Patent
Hotta (10) Patent No.: US 12,337,288 B2
(45) Date of Patent: Jun. 24, 2025

(54) MIXER

(71) Applicant: MAKITA CORPORATION, Anjo (JP)

(72) Inventor: Ryohei Hotta, Anjo (JP)

(73) Assignee: MAKITA CORPORATION, Anjo (JP)

( * ) Notice: Subject to any disclaimer, the term of this patent is extended or adjusted under 35 U.S.C. 154(b) by 462 days.

(21) Appl. No.: 17/944,788

(22) Filed: Sep. 14, 2022

(65) Prior Publication Data

US 2023/0139412 A1 May 4, 2023

(30) Foreign Application Priority Data

Oct. 29, 2021 (JP) .................. 2021-178051

(51) Int. Cl.
*B01F 33/501* (2022.01)
*B01F 101/28* (2022.01)
*B01F 101/30* (2022.01)

(52) U.S. Cl.
CPC ....... *B01F 33/5011* (2022.01); *B01F 2101/28* (2022.01); *B01F 2101/30* (2022.01)

(58) Field of Classification Search
CPC .................. B01F 33/5011; B01F 33/50115
See application file for complete search history.

(56) References Cited

U.S. PATENT DOCUMENTS

| | | | | |
|---|---|---|---|---|
| 2,023,460 A | * | 12/1935 | Beach ................... | B01F 35/413 366/285 |
| 2,048,183 A | * | 7/1936 | Dormeyer ............... | H02K 7/16 366/601 |
| 2009/0277975 A1 | * | 11/2009 | Mattson ................... | B01F 33/86 239/149 |
| 2010/0223760 A1 | * | 9/2010 | Henke ..................... | B25F 5/006 16/431 |
| 2015/0231581 A1 | * | 8/2015 | Dalmau Requejo ...... | B25F 5/02 366/129 |
| 2020/0032461 A1 | * | 1/2020 | Widlroither ............ | B25F 5/006 |
| 2021/0230810 A1 | * | 7/2021 | Widlroither ............ | E01B 27/20 |
| 2021/0288370 A1 | * | 9/2021 | Rejman .................. | H01M 50/22 |
| 2021/0347030 A1 | * | 11/2021 | Lübkert ................. | B25F 5/006 |
| 2022/0048177 A1 | * | 2/2022 | Bayha ................. | B01F 35/3204 |

FOREIGN PATENT DOCUMENTS

| | | |
|---|---|---|
| CN | 203990493 U | 12/2014 |
| CN | 205697372 U | 11/2016 |
| CN | 109261030 A | 1/2019 |
| DE | 202010014783 U1 | 1/2011 |

OTHER PUBLICATIONS

Machine translation of DE 202010014783, accessed via worldwide.espacenet.com (Year: 2011).*

Apr. 1, 2025 Office Action issued in Japanese Patent Application No. 2021-178051.

* cited by examiner

*Primary Examiner* — Marc C Howell
(74) *Attorney, Agent, or Firm* — Oliff PLC

(57) ABSTRACT

A mixer is less likely to cause lower operability due to vibration. A mixer includes a body including a motor and an output shaft to output rotation of the motor, a mixer shaft connectable to the output shaft, a handle attached to the body and including a grip, and a vibration isolator between the mixer shaft and the grip.

12 Claims, 13 Drawing Sheets

MIXER

CROSS-REFERENCE TO RELATED APPLICATIONS

This application claims the benefit of priority to Japanese Patent Application No. 2021-178051, filed on Oct. 29, 2021, the entire contents of which are hereby incorporated by reference.

BACKGROUND

1. Technical Field

The present disclosure relates to a mixer for mixing fluid materials, such as paint and mortar, and non-fluid materials, such as sand and gravel.

2. Description of the Background

A mixer has a spindle protruding from a body accommodating a motor, and a mixer shaft connectable to the spindle to receive rotation of the motor. A blade is attached to the mixer shaft. The mixer can mix a material such as paint with the blade rotating together with the mixer shaft. A handle is fixed to the body. An operator holds left and right grips on the handle to support the body (e.g., German Utility Application Publication No. 202010014783).

BRIEF SUMMARY

The known mixer can have vibration in the body as the motor rotates and vibration at the mixing blade. Such vibration is transmitted to the hands of the operator holding the grips, thus lowering the operability.

One or more aspects of the present disclosure are directed to a mixer that is less likely to cause lower operability due to vibration.

A first aspect of the present disclosure provides a mixer, including:
- a body including a motor and an output shaft to output rotation of the motor;
- a mixer shaft connectable to the output shaft;
- a handle attached to the body, the handle including a grip; and
- a vibration isolator between the mixer shaft and the grip.

The mixer according to the above aspect of the present disclosure is less likely to cause lower operability due to vibration.

DETAILED DESCRIPTION

First Embodiment

Embodiments of the present disclosure will now be described with reference to the drawings.

Figure 1:
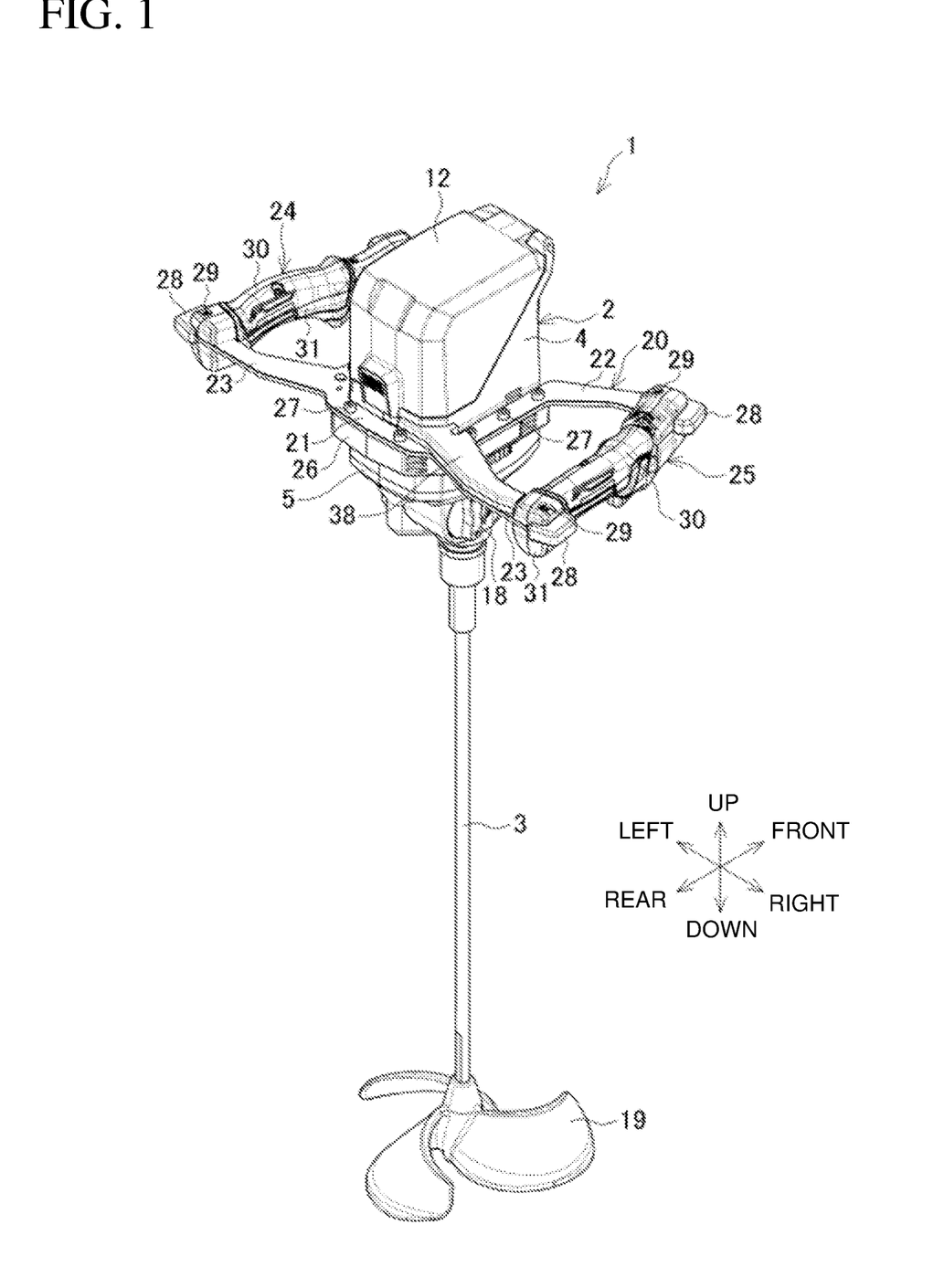
FIG. 1 is an overall perspective view of a mixer according to a first embodiment.
Figure 2:
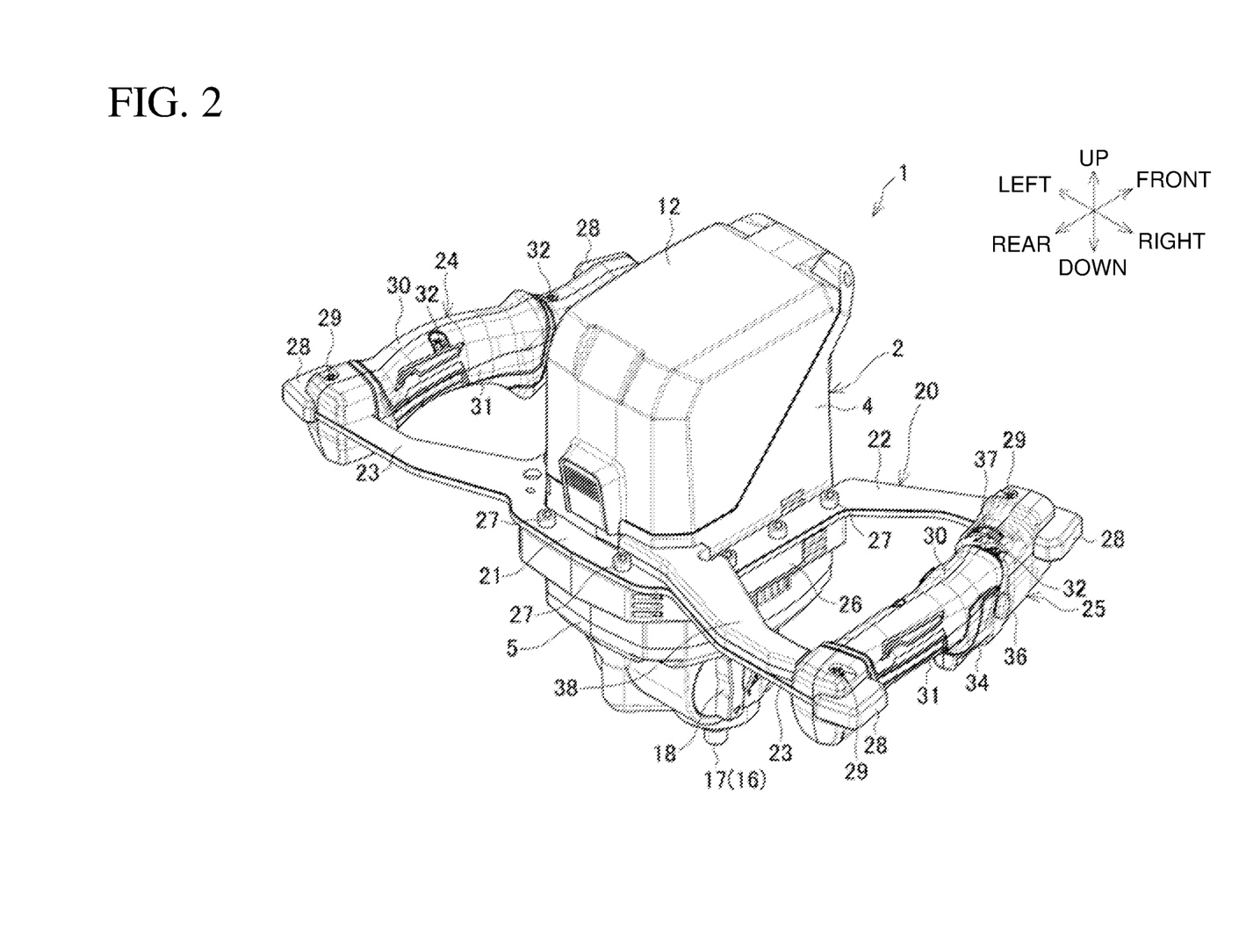
FIG. 2 is a perspective view of a body of the mixer according to the first embodiment.
Figure 3:
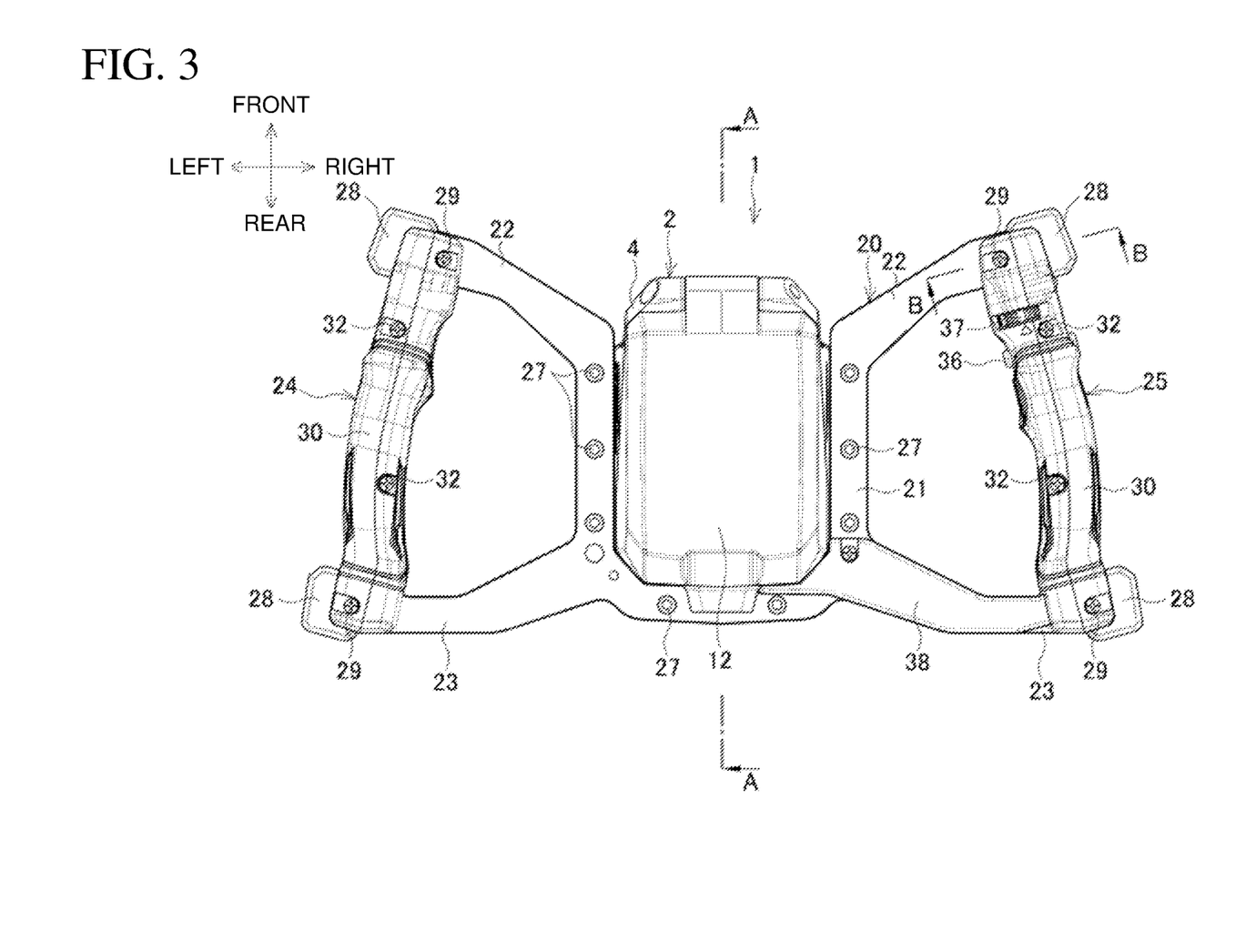
FIG. 3 is a plan view of the body of the mixer according to the first embodiment.
Figure 4:
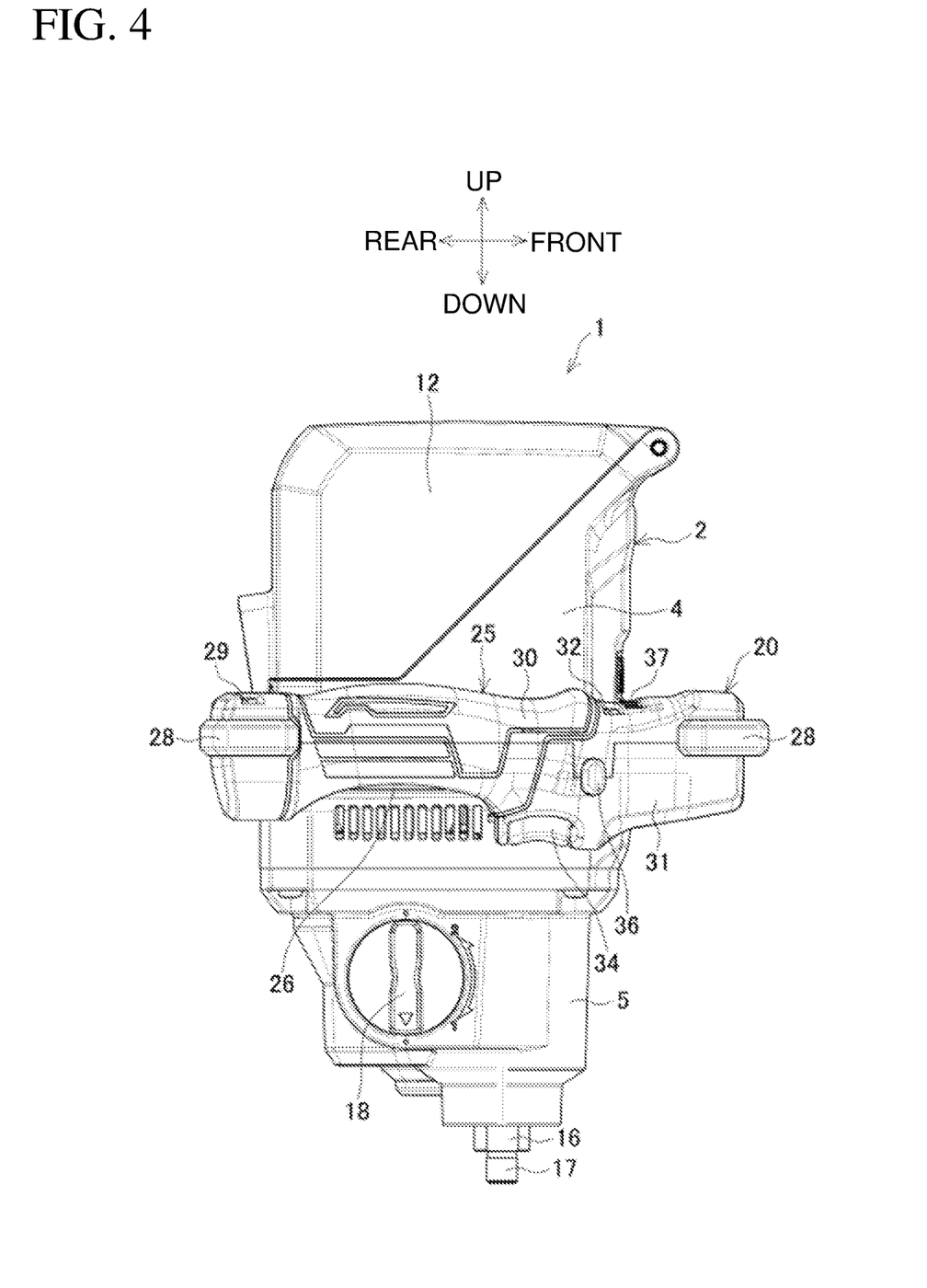
FIG. 4 is a side view of the body of the mixer according to the first embodiment.
Figure 5:
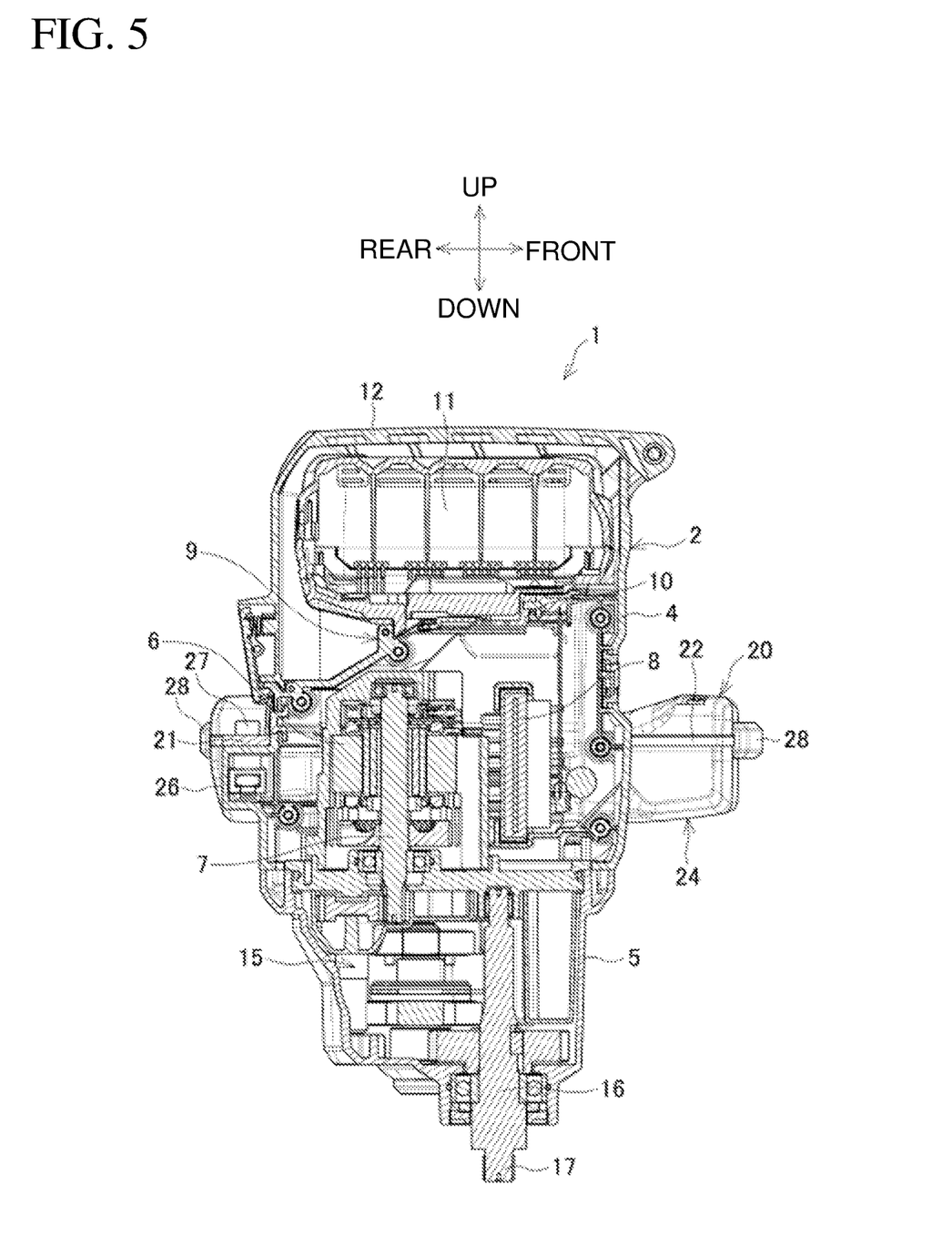
FIG. 5 is a cross-sectional view taken along line A-A in FIG. 3.

FIG. 1 is an overall perspective view of a rechargeable mixer 1 as an example of a mixer. FIG. 2 is a perspective view of a body. FIG. 3 is a plan view of the body. FIG. 4 is a side view of the body. FIG. 5 is a cross-sectional view taken along line A-A in FIG. 3.

The mixer 1 includes a body 2 and a mixer shaft 3.

The body 2 includes, as its housing, a motor housing 4 and a reducer housing 5. The motor housing 4 accommodates a motor 6 in its rear portion and a controller 8 in its front portion. The motor 6 is supported with a rotational shaft 7 extending downward. The rotational shaft 7 has its lower end protruding in the reducer housing 5.

The motor housing 4 has a battery mount 9 on its upper portion. The battery mount 9 includes a terminal base 10. A battery pack 11 is slid on and attached to the terminal base 10 from the front. A battery cover 12 is attached to the upper portion of the motor housing 4. The battery cover 12 covers the battery pack 11 and the battery mount 9 from above.

The reducer housing 5 accommodates a reducer 15. The reducer 15 includes a spindle 16. The spindle 16 protrudes downward from the lower end of the reducer housing 5. The spindle 16 has a thread 17 on its lower end. The reducer 15 includes multiple gears. The reducer 15 reduces rotation of the rotational shaft 7 and transmits the reduced rotation to the spindle 16. A switch lever 18 is located on a right side surface of the reducer housing 5. The rotational speed of the spindle 16 is switchable between two levels, or specifically, high and low, in response to an operation on the switch lever 18.

The mixer shaft 3 is coaxially connectable with the thread 17 on the spindle 16. A blade 19 is attached to a lower end of the mixer shaft 3.

A handle 20 is attached to the body 2. The handle 20 includes a fixture 21, a pair of left and right front arms 22, a pair of left and right rear arms 23, a left grip 24, and a right grip 25.

The fixture 21 is attached to the motor housing 4. The fixture 21 is U-shaped as viewed in plan and is a vertically thin metal sheet. The motor housing 4 has, on its outer peripheral surface, a flange 26 supporting the fixture 21 from below. The fixture 21 on the upper surface of the flange 26 is fastened to the flange 26 with multiple bolts 27 from above.

The front arms 22 are integral with the fixture 21 and extend from the front end of the fixture 21 outward to the left and to the right. The rear arms 23 are integral with the fixture 21 and extend from the rear portion of the fixture 21 outward to the left and to the right. Each of the front arms 22 and the rear arms 23 has its outer left and right ends receiving a protective portion 28 formed from rubber. The protective portions 28 are thicker than the arms 22 and 23.

The left grip 24 and the right grip 25 are located nearer the middle in the lateral direction than the protective portions 28. The left grip 24 and the right grip 25 extend across the ends of the front arms 22 and the rear arms 23 in the front-rear direction. The left grip 24 and the right grip 25 have their front ends fastened to the ends of the front arms 22 with screws 29 and their rear ends fastened to the ends of the rear arms 23 with screws 29.

Each of the left grip 24 and the right grip 25 is dividable into two halves, or specifically, an upper half part 30 and a lower half part 31, with the corresponding one of the front and rear arms 22 and 23. The upper half part 30 and the lower half part 31 are joined together with multiple screws 32 from above.

Figure 6:
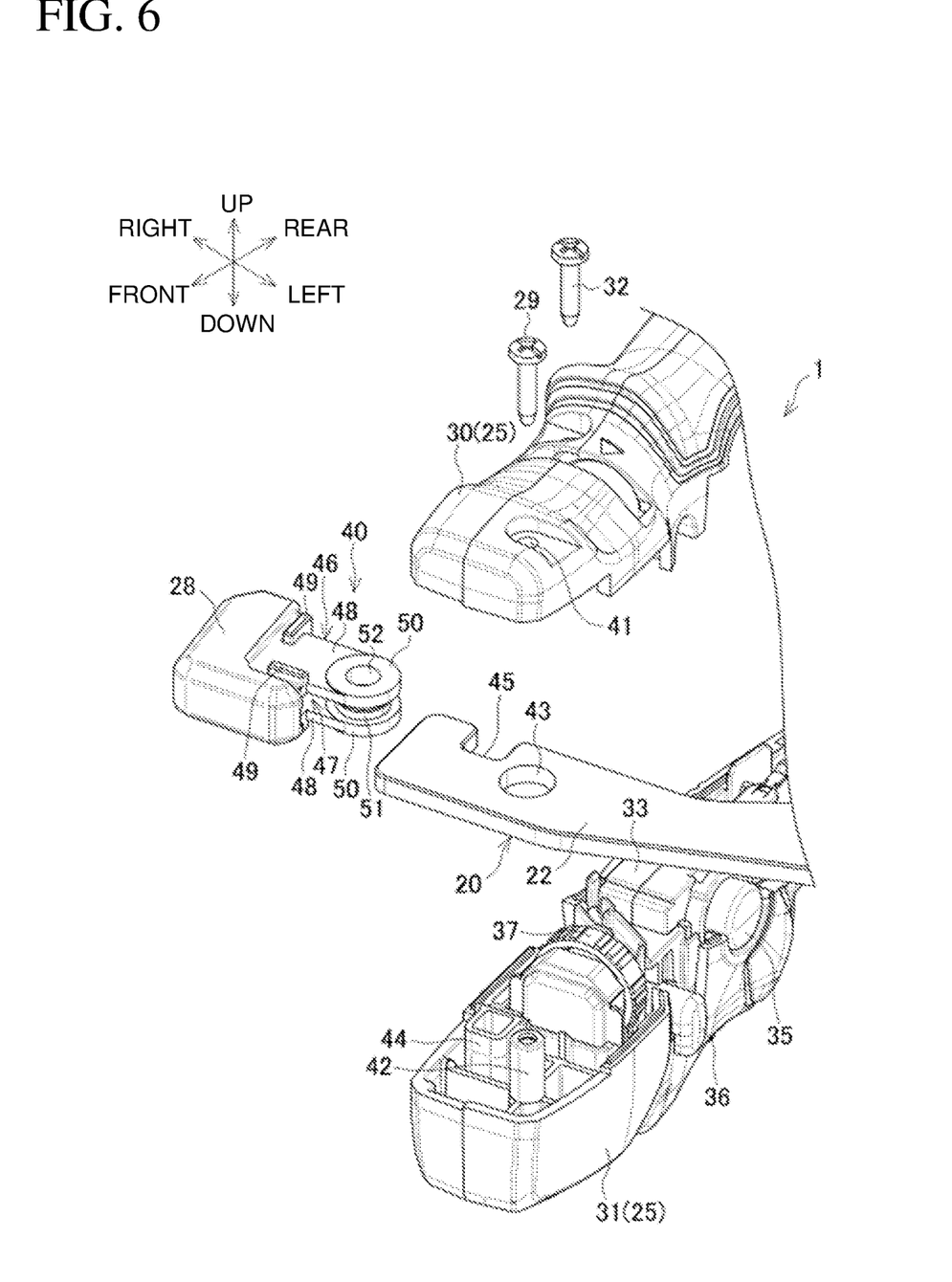
FIG. 6 is an exploded perspective view of a vibration isolator in the first embodiment.

As shown in FIG. 6, the right grip 25 accommodates a switch 33. The switch 33 includes a trigger 34. The trigger 34 protrudes from a lower surface of the right grip 25. A lock button 35 is located on a left side surface of the right grip 25. The lock button 35 locks the trigger 34 being pressed. A lock lever 36 is located in front of the switch 33. The lock lever 36 can slide between a position at which the trigger 34 is locked and cannot be pressed and a position at which the trigger 34 is allowed to be pressed.

The lock lever 36 includes an adjustment dial 37 on its front portion. The rotational speed of the motor 6 can be adjusted by rotating the adjustment dial 37. The adjustment dial 37 is exposed on an upper surface of the right grip 25.

A lead wire cover 38 is fastened to the upper surfaces of the right rear arm 23 and the fixture 21 with screws. A lead wire connected to the switch 33 accommodated in the right grip 25 and a lead wire connected to a substrate for the adjustment dial 37 are routed inside the lead wire cover 38. Each of these lead wires is routed into the motor housing 4 through a wiring port (not shown) in the rear surface of the motor housing 4. The lead wire for the switch 33 is connected to the controller 8 and to the terminal base 10. The lead wire for the adjustment dial 37 is routed to the controller 8.

Vibration isolators 40 are located between the front and rear arms 22 and 23 and the front and rear ends of the left and right grips 24 and 25. The structure of each vibration isolator 40 will now be described. Each vibration isolator 40 has the same structure. The vibration isolator 40 between the front arm 22 on the right and the front end of the right grip 25 shown in FIG. 6 will now be described as a typical example.

At the front end of the right grip 25, the upper half part 30 has an insertion hole 41 extending in the vertical direction. A screw 29 is placed in the insertion hole 41 from above. The lower half part 31 has a screw boss 42 extending upward to receive the screw 29 being screwed. The front arm 22 has a through-hole 43, through which the screw boss 42 extends. The lower half part 31 includes a positioner 44 at the rear outside of the screw boss 42. The positioner 44 is cylindrical and extends upward. The front arm 22 has, in its rear edge, a cutout 45 to be engaged with the positioner 44.

Figure 7:
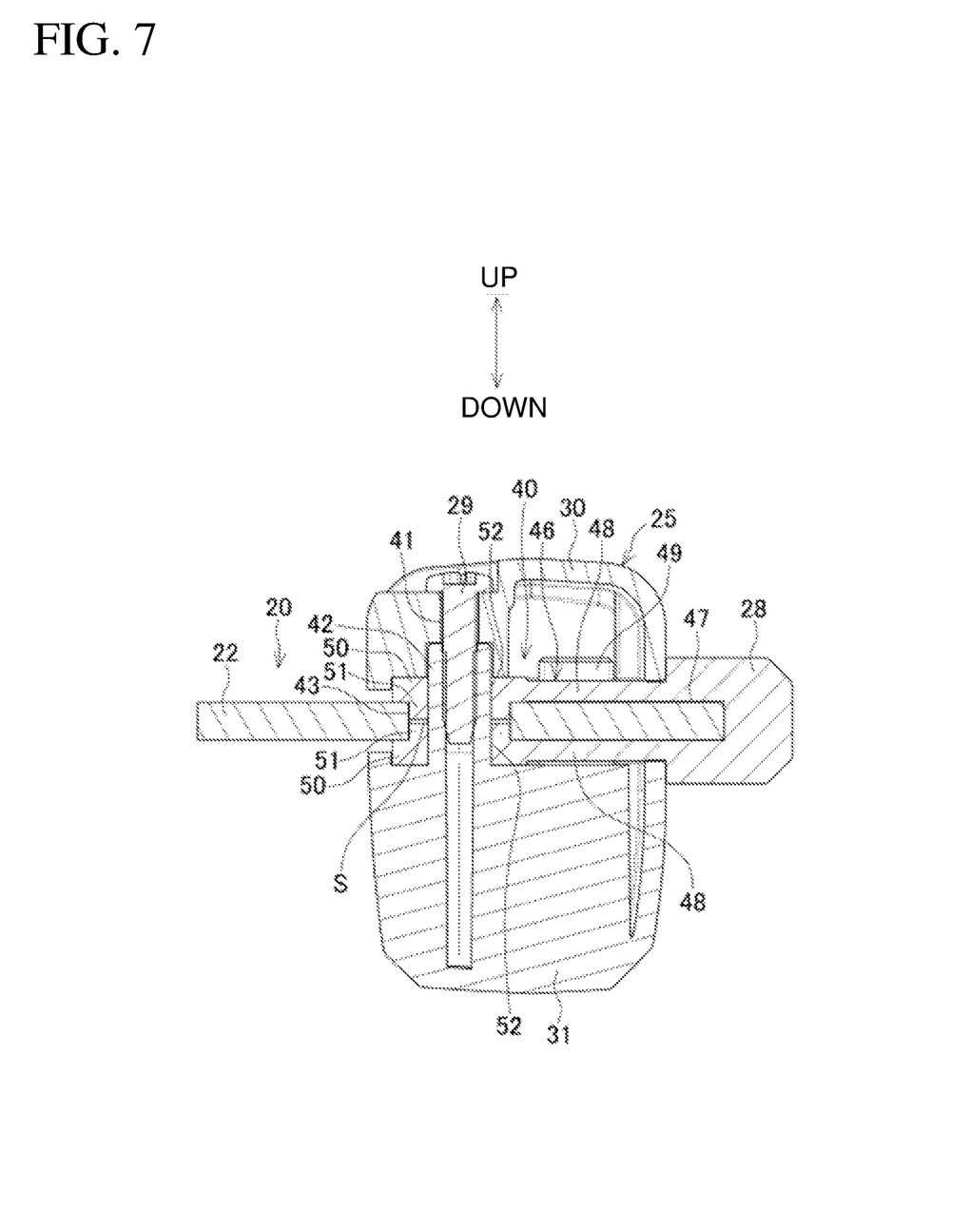
FIG. 7 is an enlarged cross-sectional view taken along line B-B in FIG. 3.

Each vibration isolator 40 includes a rubber member 46 integral with the protective portion 28. The rubber member 46 is thinner than the protective portion 28 and extends from the protective portion 28 toward the middle along the front arm 22. The protective portion 28 and the rubber member 46 have a slit 47 to receive the end of the front arm 22 as also shown in FIG. 7. The slit 47 divides the rubber member 46 into a pair of divided pieces 48 above and below the front arm 22. An upper divided piece 48 has, on its upper surface, two engagement projections 49 that engage with the inside of the upper half part 30. A lower divided piece 48 has, on its lower surface, two engagement projections 49 that engage with the inside of the lower half part 31.

The divided pieces 48 each include a circular portion 50 integral with their ends to cover the through-hole 43 from above or from below. Each circular portion 50 has a greater diameter than the through-hole 43. The circular portions 50 have, on their facing surfaces, protrusions 51 that are circular as viewed in plan. The protrusions 51 fit into the through-hole 43 from above and from below. A space S is left in the vertical direction between the protrusions 51 in the through-hole 43. Each circular portion 50 has a through-hole 52 at its center. The screw boss 42 extends through each through-hole 52 from below.

To attach the right grip 25 to the front arm 22, the end of the front arm 22 is first placed into the slit 47 in the protective portion 28 and the rubber member 46. The protrusions 51 on the upper and lower divided pieces 48 then fit into the through-hole 43 in the front arm 22 from above and from below. This positions the protective portion 28 and the rubber member 46.

The screw boss 42 in the lower half part 31 is then placed through the through-hole 52 in each circular portion 50, and the positioner 44 is engaged with the cutout 45. The screw boss 42 then extends through each circular portion 50 and protrudes above the rubber member 46. In this state, the upper half part 30 is placed over the lower half part 31 from above. The screw 29 extending through the insertion hole 41 is then screwed into the screw boss 42. As shown in FIG. 7, the upper half part 30 and the lower half part 31 including the screw joint are joined to the front arm 22 with the rubber member 46 in between. In this state, the right grip 25, including the screw boss 42 and the screw 29, is not in direct contact with the front arm 22.

An operator of the mixer 1 holds the left grip 24 and the right grip 25 on the handle 20. The mixer 1 is thus supported with the mixer shaft 3 protruding downward. The operator in this posture presses the trigger 34 on the right grip 25 to turn on the switch 33. The motor 6 is then driven to rotate the rotational shaft 7. The rotation of the rotational shaft 7 is reduced by the reducer 15 in either a high speed mode or a variable speed mode selected with the switch lever 18 and is transmitted to the spindle 16. As the mixer shaft 3 connectable to the spindle 16 rotates, the blade 19 that rotates with the mixer shaft 3 mixes a material such as paint.

During the operation, the operator holding the left and right grips 24 and 25 to support the mixer 1 views, from above the motor housing 4 and the battery cover 12, the blade 19 on the lower end of the mixer shaft 3, the mixer shaft 3, and the material being mixed. In this state, the fixture 21 in the handle 20 is not in front of the motor housing 4 and the battery cover 12 and thus can avoid obstructing the field of view of the operator. The operator can thus reliably view, for example, the blade 19.

During the operation, vibration is generated on the blade 19 or vibration is generated as the motor 6 is driven. Such vibration is transmitted from the body 2 to the front and rear arms 22 and 23 of the handle 20. The rubber members 46 in the vibration isolators 40 are between the front and rear arms 22 and 23 and the left and right grips 24 and 25. Thus, the rubber member 46 reduces the vibration. The vibration in the vertical direction is absorbed by elastic deformation of the circular portion 50 of each divided piece 48 in the thickness direction above and below the front and rear arms 22 and 23.

The vibration in the front-rear and lateral directions is absorbed by elastic deformation of the protrusions 51 that fit in the through-hole 43. The space S is left in the thickness direction between the protrusions 51. This structure allows vibration isolation without the protrusions 51 being in contact with each other and obstructing elastic deformation.

This structure reduces vibration transmitted to the hands holding the left and right grips 24 and 25, thus reducing discomfort felt by the operator.

The mixer 1 according to the first embodiment includes the body 2 including the motor 6 and the spindle 16 (output shaft) to output the rotation of the motor 6. The mixer 1 includes the mixer shaft 3 connectable to the spindle 16 and the handle 20 attached to the body 2 and including the left and right grips 24 and 25 (grip). The mixer 1 includes the vibration isolators 40 between the mixer shaft 3 and the left and right grips 24 and 25 (between the front and rear arms 22 and 23 and the left and right grip 24 and 25 in the present embodiment).

In this structure, vibration generated in the body 2 as the motor 6 rotates and vibration generated on the mixing blade 19 are absorbed by the vibration isolators 40. Thus, vibration is less likely to be transmitted directly to the hands of the operator holding the left and right grips 24 and 25. This structure thus is less likely to cause lower operability due to vibration.

The handle 20 includes the fixture 21 attached to the body 2, the front and rear arms 22 and 23 (arm) protruding from the fixture 21, and the left and right grips 24 and 25 (grip) attached to the front and rear arms 22 and 23. The vibration isolators 40 are between the front and rear arms 22 and 23 and the left and right grips 24 and 25.

This structure effectively reduces vibration transmitted from the left and right grips 24 and 25 to the hands of the operator.

The vibration isolators 40 include the rubber members 46 (elastic member) between the front and rear arms 22 and 23 and the left and right grips 24 and 25.

Each vibration isolator 40 is thus formed easily.

Each of the left and right grips 24 and 25 is dividable into two halves, or specifically, the upper half part 30 and the lower half part 31 (half parts), with the corresponding one of the front and rear arms 22 and 23 in between. The rubber member 46 covers the front or rear arm 22 or 23 and is held between the two parts, or specifically, between the upper half part 30 and the lower half part 31.

The rubber member 46 is readily placed between the upper half part 30 and the lower half part 31 when the upper half part 30 and the lower half part 31 are joined together.

The upper half part 30 and the lower half part 31 are joined with a screw 29 (screw member) extending through the through-hole 43 in the front or rear arm 22 or 23. The lower half part 31 (one half part) includes the screw boss 42 extending through the through-hole 43. Each rubber member 46 includes the protrusion 51 extending through the screw boss 42 and fitting in the through-hole 43.

This structure reliably allows vibration isolation at the screw joint between the upper half part 30 and the lower half part 31.

The front and rear arms 22 and 23 are plates. Each rubber member 46 has the slit 47 receiving the front or rear arm 22 or 23. The slit 47 divides the rubber member 46 into the two divided pieces 48 in the thickness direction of the front or rear arm 22 or 23. Each divided piece 48 includes the protrusion 51.

This allows vibration isolation at the screw joint and also facilitates positioning of the rubber member 46 on the front or rear arm 22 or 23.

The space S is left in the thickness direction between the protrusions 51 on the divided pieces 48 in the through-hole 43.

This structure allows vibration isolation without the protrusions 51 being in contact with each other and obstructing elastic deformation of the divided pieces 48.

The front and rear arms 22 and 23 are laterally symmetric with respect to the body 2. The left and right grips 24 and 25 are located on the respective left and right front and rear arms 22 and 23.

This structure supports the body 2 in a balanced manner, and reduces vibration in both the left and right grips 24 and 25.

The front and rear arms 22 and 23 protrude outward from the left grip 24 and each include the protective portion 28 connecting to the rubber member 46 at the protruding end of the corresponding arm, and the front and rear arms 22 and 23 protrude outward from the right grip 25 and each include the protective portion 28 connecting to the rubber member 46 at the protruding end of the corresponding arm.

Thus, the ends of the front and rear arms 22 and 23 are protected. The protective portions 28 are attached when the rubber members 46 are attached.

In the first embodiment, the shape of each vibration isolator may be changed as appropriate. For example, each vibration isolator is not limited to the rubber member including two divided pieces divided by the slit, but may be a structure including two rubber members that are separate from each other above and below the arm. The rubber member may include upper and lower divided pieces continuous with each other in the through-hole. The screw boss may extend through the continuous pieces in the through-hole.

The rubber member may be separate from the protective portion.

The screw boss may be in the upper half part, instead of being in the lower half part.

The upper half part and the lower half part may be screwed at multiple positions with the front and rear arms. In this case, the vibration isolator may be provided for each screw joint, or may be formed across multiple screw joints.

The handle includes the front and rear arms on each of the left and the right. The handle may include the front arm alone on each of the left and the right, and may have the left and right grips attached to each front arm.

Second Embodiment

A second embodiment will now be described. The main components of a mixer according to the present embodiment are the same as in the first embodiment. The same components as in the first embodiment are given the same reference numerals and will not be described repeatedly. The mixer according to the present embodiment will be described focusing on its vibration isolators.

Figure 8:
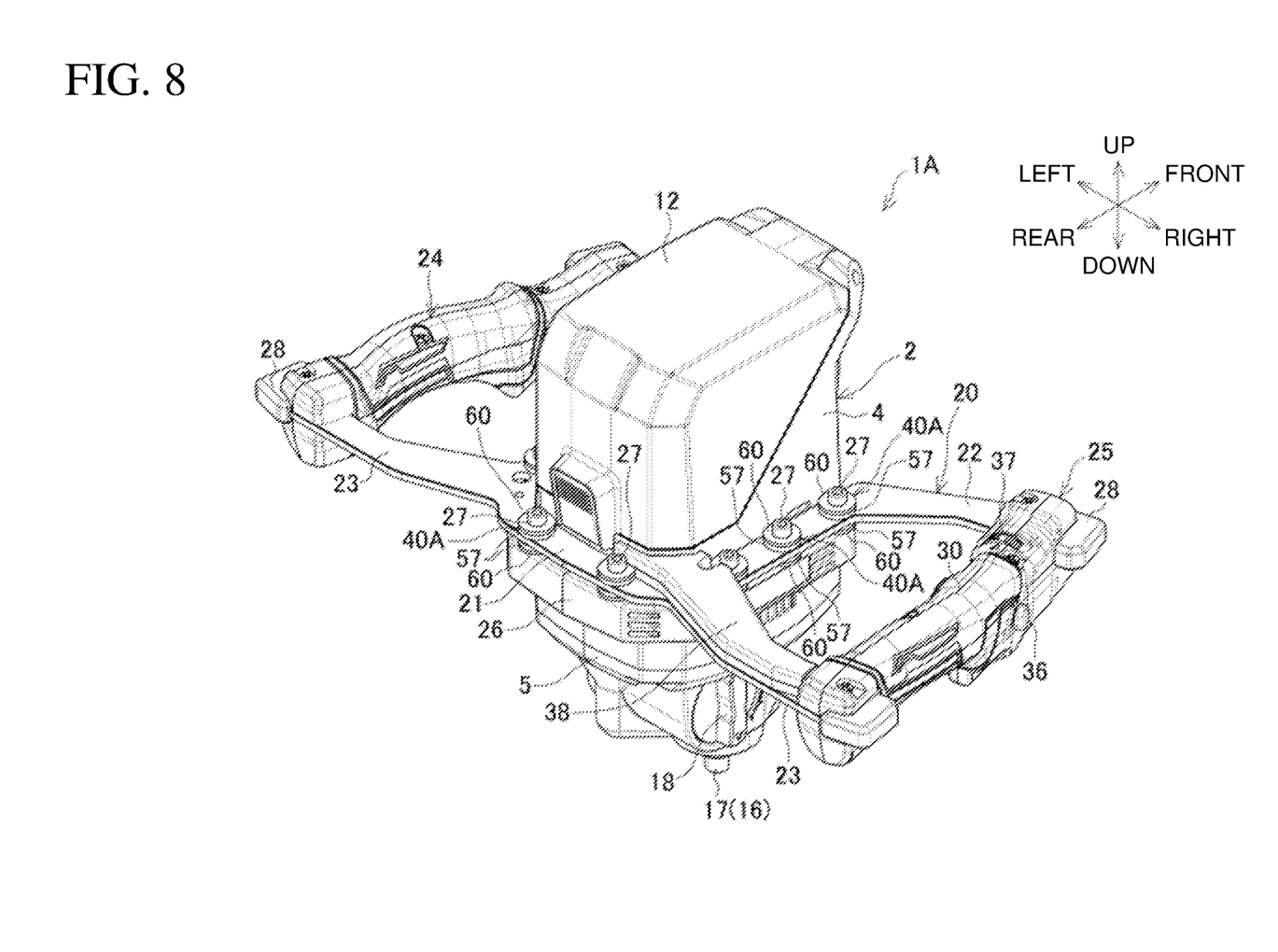
FIG. 8 is a perspective view of a body of a mixer according to a second embodiment.

A mixer 1A shown in FIG. 8 includes vibration isolators 40A between the body 2 and the handle 20 at positions at which the fixture 21 is fixed with the bolts 27.

Figure 9:
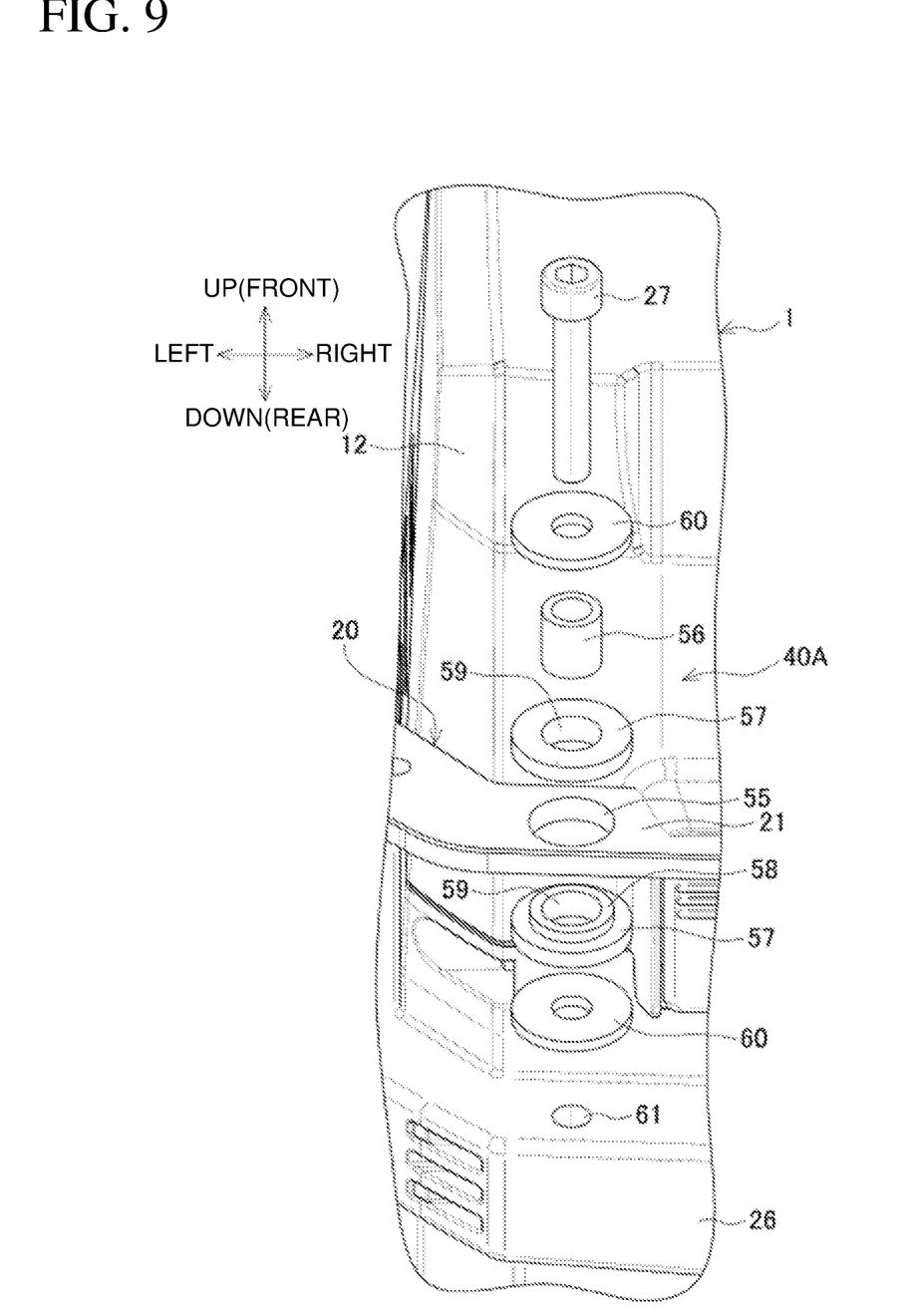
FIG. 9 is an exploded perspective view of a vibration isolator in the second embodiment.
Figure 10:
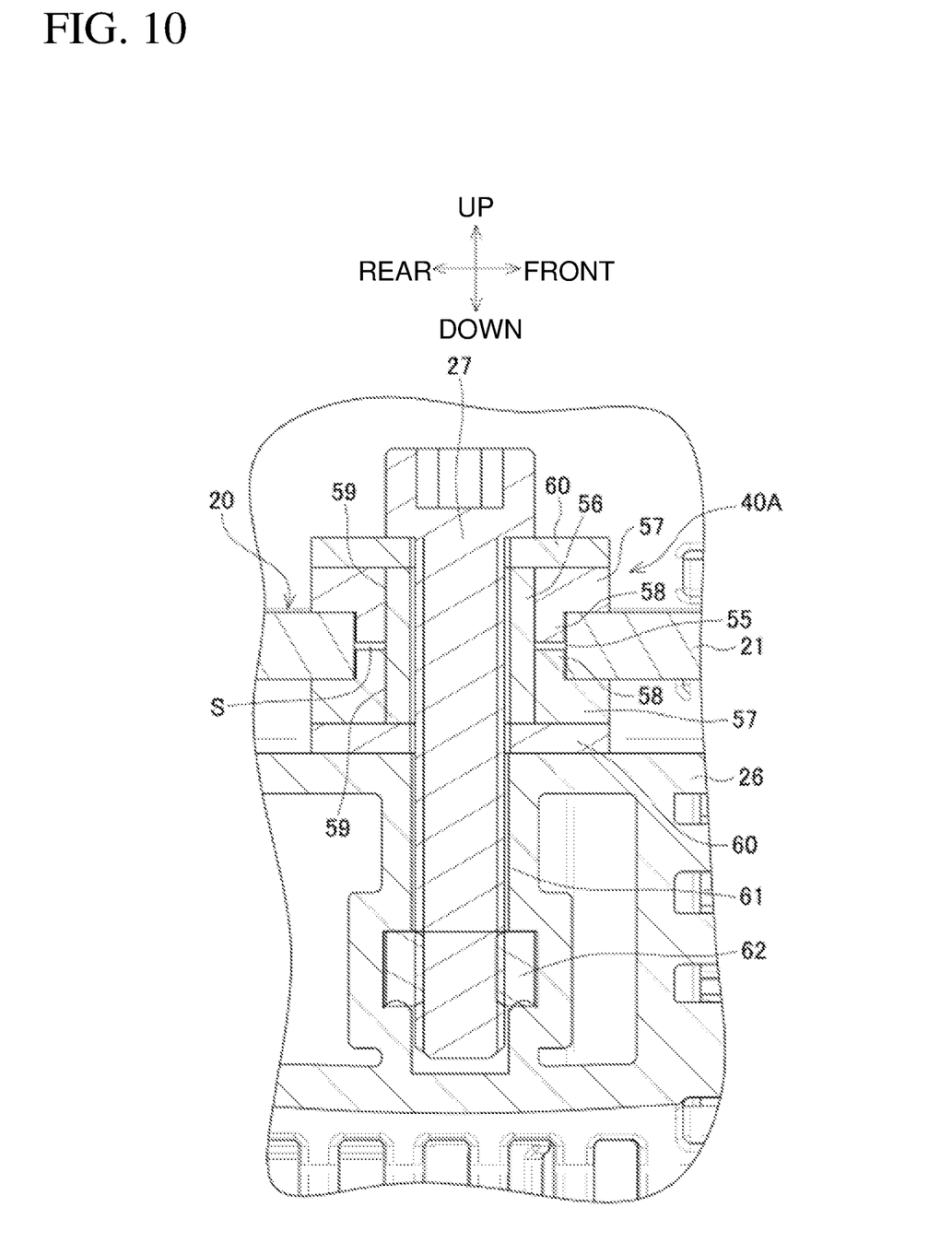
FIG. 10 is an enlarged longitudinal sectional view of a middle part of the vibration isolator in the second embodiment.

The fixture 21 has fastener holes 55 each with a greater diameter than the bolt 27 as shown in FIGS. 9 and 10. A sleeve 56 is externally located on the bolt 27 and extends through the fastener hole 55. The sleeve 56 has a smaller diameter than the fastener hole 55.

A pair of rubber members 57 that are circular as viewed in plan are located above and below the fixture 21 to serve as a vibration isolator 40A. The rubber members 57 each have a greater diameter than the fastener hole 55. The rubber members 57 each have a protrusion 58 on their facing surfaces. The protrusion 58 fits into the fastener hole 55. A space S is left in the thickness direction between the facing protrusions 58. Each rubber member 57 has a through-hole 59 at its center. The bolt 27 and the sleeve 56 extend through the through-hole 59.

The axial length of the sleeve 56 is substantially equal to the vertical thickness of the portion including the rubber members 57 above and below the fixture 21. Washers 60 are located to sandwich the sleeve 56 and the upper and lower rubber members 57. The bolt 27 extends through the washers 60.

When attaching the handle 20 to the mixer 1A, the sleeve 56 is placed in the fastener hole 55 and the rubber members 57 are placed above and below the fastener hole 55. With the washers 60 above and below the rubber members 57, the fixture 21 is placed on the flange 26. In this state, the bolt 27 is placed, from above, through the washers 60 and the sleeve 56 into a threaded hole 61 in the flange 26. A nut 62 is held in a lower portion of the threaded hole 61. As the bolt 27 is tightened with the nut 62, the washers 60 and the sleeve 56 are fixed to the flange 26 with the bolt 27. In this state, the fixture 21 is held between the upper and lower rubber members 57 between the washers 60 and is not in contact with the sleeve 56 and the washers 60.

Thus, any vibration generated during operation transmitted to the motor housing 4 is reduced by the rubber members 57 with the vibration isolators 40A between the motor housing 4 and the fixture 21. The vibration in the vertical direction is absorbed by elastic deformation of the rubber members 57 above and below the fixture 21. The vibration in the front-rear and lateral directions is absorbed by elastic deformation of the protrusions 58 that fit in the fastener hole 55.

This structure reduces vibration transmitted to the hands holding the left and right grips 24 and 25, thus reducing discomfort felt by the operator.

The mixer 1A according to the second embodiment includes the body 2 including the motor 6 and the spindle 16 to output the rotation of the motor 6. The mixer 1A includes the mixer shaft 3 connectable to the spindle 16 and the handle 20 attached to the body 2 and including the left and right grips 24 and 25. The mixer 1A includes the vibration isolators 40A between the mixer shaft 3 and the left and right grips 24 and 25 (between the body 2 and the handle 20).

In this structure, vibration generated in the body 2 as the motor 6 rotates and vibration generated on the mixing blade 19 are absorbed by the vibration isolators 40A and are less likely to be transmitted directly to the hands of the operator holding the left and right grips 24 and 25. This structure thus is less likely to cause lower operability due to vibration.

The vibration isolators 40A are located between the body 2 and the handle 20.

This structure effectively reduces vibration transmitted from the body 2 to the handle 20.

The handle 20 includes the fixture 21 attached to the body 2, the front and rear arms 22 and 23 attached to the fixture 21, and left and right grips 24 and 25 attached to the front and rear arms 22 and 23. Each vibration isolator 40A includes the rubber members 57 between the body 2 and the fixture 21.

Each vibration isolator 40A is thus formed easily.

The fixture 21 is joined with the bolts 27 (screw member) extending through the fastener holes 55 in the fixture 21. The rubber members 57 are also between the fixture 21 and the bolts 27.

This allows effective vibration isolation at the fastening portions with the bolts 27.

The sleeve 56 extending through the fastener hole 55 is externally located on each bolt 27. Each rubber member 57 includes the protrusion 58 that fits in the fastener hole 55 and surrounds the sleeve 56.

This structure allows reliable vibration isolation at the fastener holes 55.

In the second embodiment, the number of bolts is not limited. More bolts or fewer blots than in the embodiment may be used as appropriate.

Although the rubber members are separately provided above and below the fixture in the second embodiment, the rubber members may be continuous with each other and fit in the fastener hole through which the bolt and the sleeve extend.

Rubber members continuous with and integral with one another may be used across adjacent multiple bolts.

The fixture may have a shape different from the shape in the above embodiments. The fixture may be annular around the body.

The flange for fastening the fixture may have a shape different from the shape continuous in the circumferential direction of the body. The flange may protrude intermittently from the body at the fastening portions with the bolts.

Third Embodiment

Figure 11:
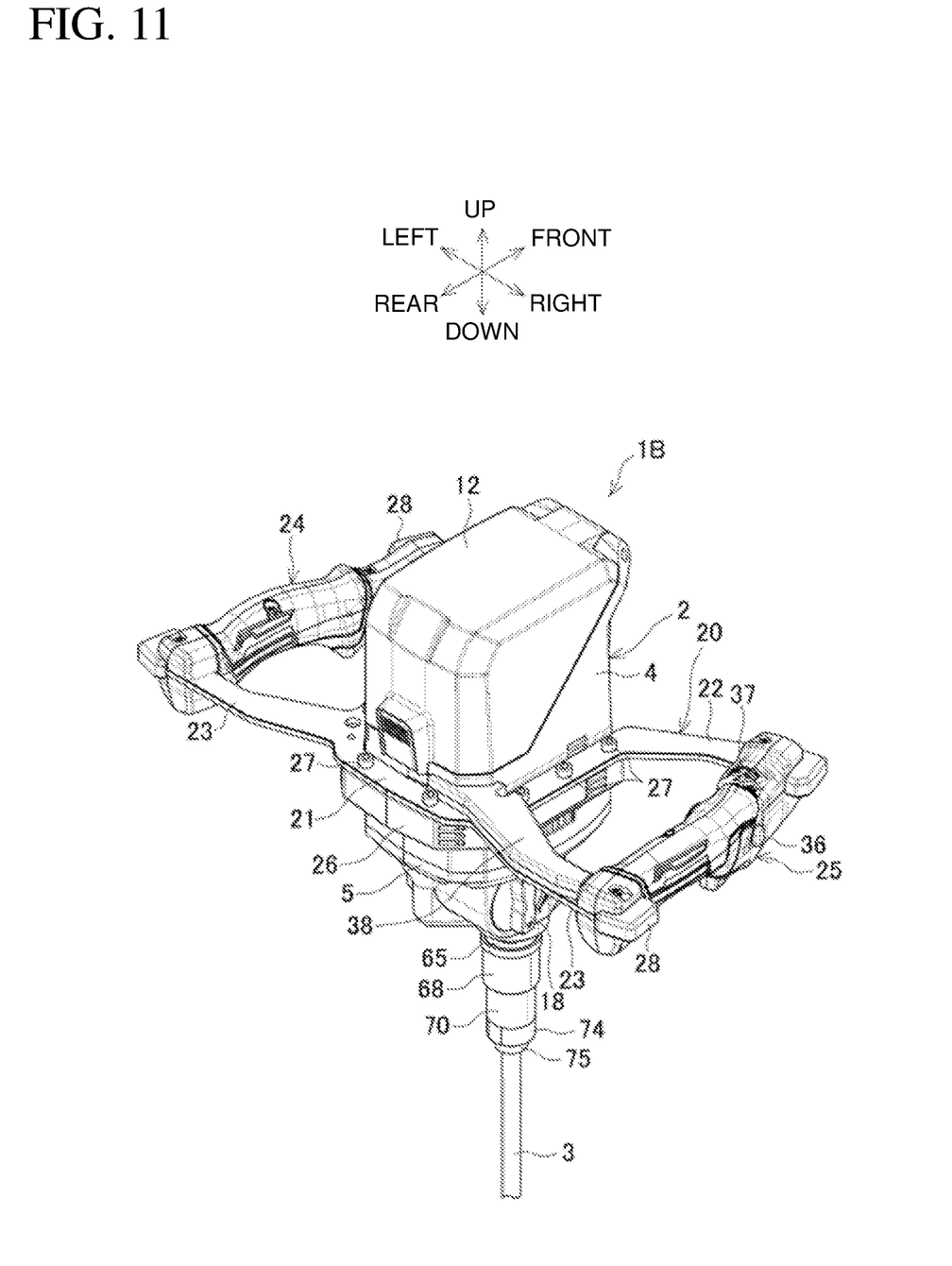
FIG. 11 is a perspective view of a mixer according to a third embodiment.
Figure 12:
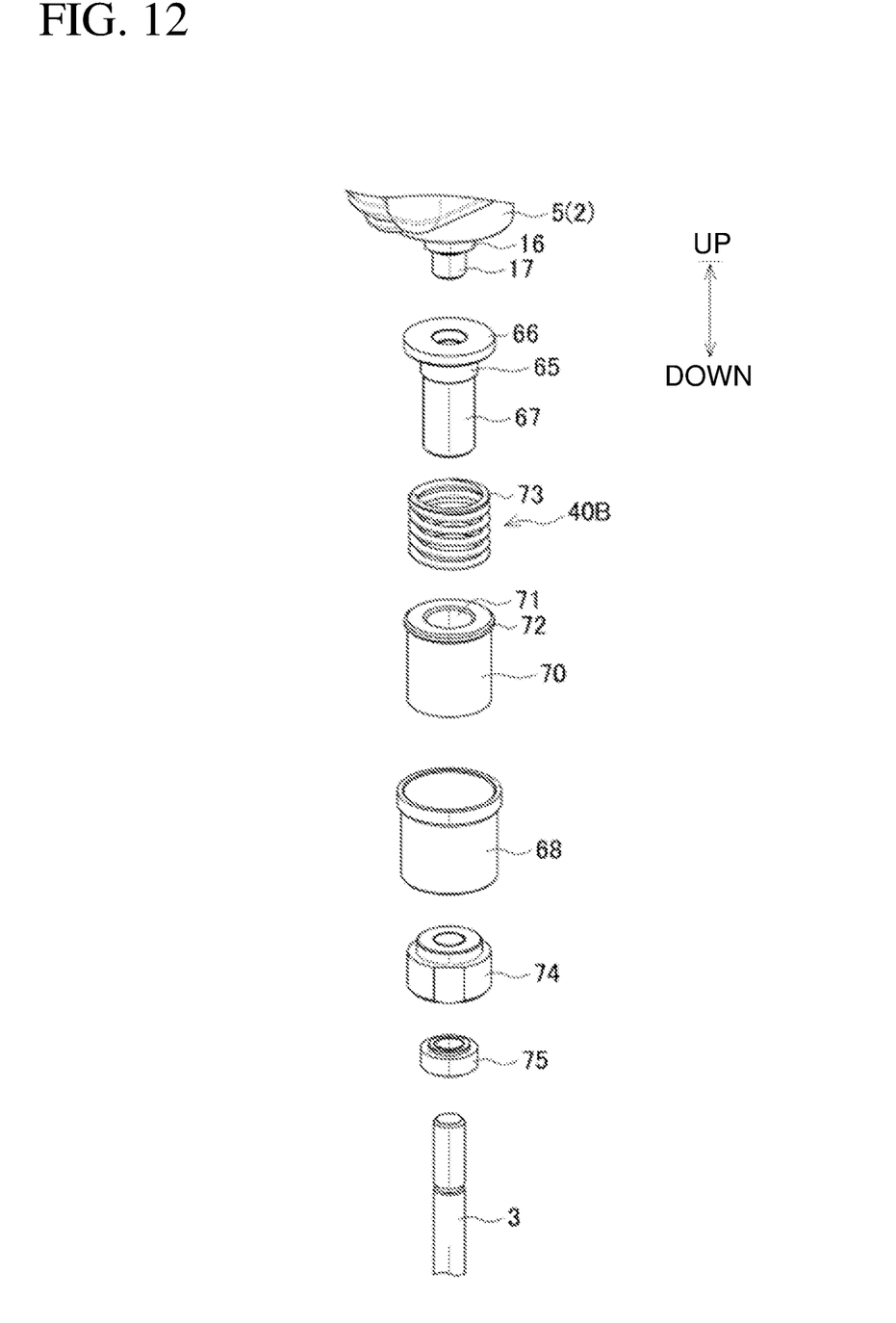
FIG. 12 is an exploded perspective view of a vibration isolator in the third embodiment.
Figure 13:
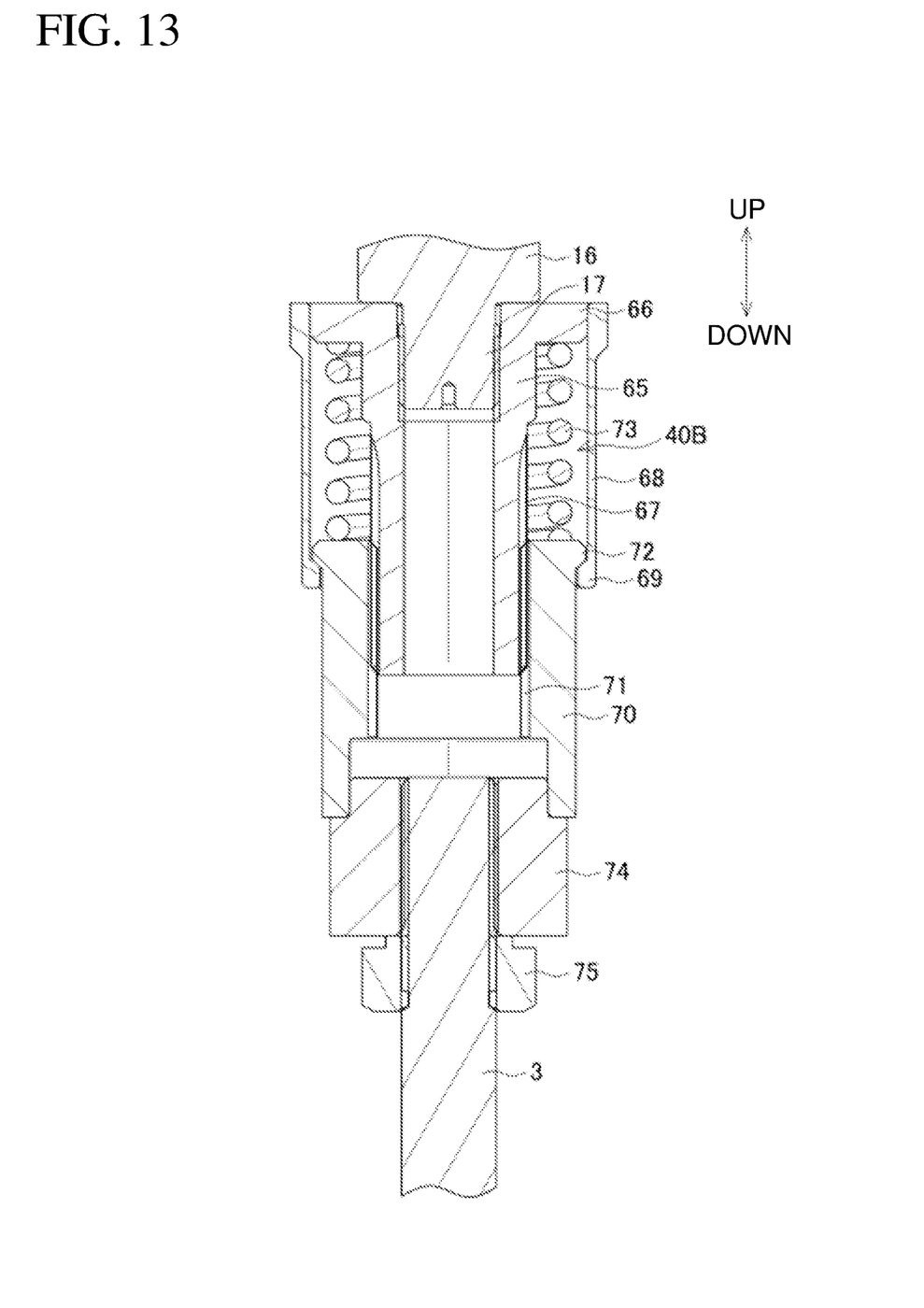
FIG. 13 is an enlarged longitudinal sectional view of a middle part of the vibration isolator in the third embodiment.

A mixer 1B shown in FIG. 11 includes a vibration isolator 40B between the spindle 16 and the mixer shaft 3 as shown in FIGS. 12 and 13. An upper sleeve 65 is screwed and coupled to the thread 17 on the spindle 16. The upper sleeve 65 has a flange 66 on its upper end. The upper sleeve 65 has, on its lower periphery, an inner spline 67 with multiple spline teeth extending in the axial direction. An outer sleeve 68 is externally located on the upper sleeve 65. The outer sleeve 68 has its upper end fixed to the flange 66 on the upper sleeve 65. The outer sleeve 68 has an outer stopper 69 on its inner circumference at the bottom. The outer stopper 69 is annular and protrudes inward in the radial direction.

A lower sleeve 70 is externally located on the upper sleeve 65. The lower sleeve 70 has a diameter smaller than the inner diameter of the outer sleeve 68. The lower sleeve 70 has, on its inner circumference, an outer spline 71 with multiple spline teeth extending in the axial direction. The outer spline 71 is engaged with the inner spline 67 on the upper sleeve 65. Thus, the lower sleeve 70 can rotate integrally with the upper sleeve 65 and move relative to the upper sleeve 65 in the vertical direction. The lower sleeve 70 has its upper portion between the upper sleeve 65 and the outer sleeve 68. The lower sleeve 70 includes an annular inner stopper 72 on its outer circumference at the upper edge. The inner stopper 72 protrudes radially outward. The inner stopper 72 is engageable, from above, with the outer stopper 69 in the outer sleeve 68.

A coil spring 73 is externally located on the upper sleeve 65 between the flange 66 and the lower sleeve 70 to form the vibration isolator 40B. Thus, the lower sleeve 70 is urged by the coil spring 73 to a lower limit position at which the inner stopper 72 is engaged with the outer stopper 69 from above.

A coupler 74 is fixed to the lower end of the lower sleeve 70. The upper end of the mixer shaft 3 is inserted and fixed at the center of the coupler 74. The coupler 74 is locked from rotation with a tightening nut 75.

When the spindle 16 in the mixer 1B rotates, the outer sleeve 68 and the lower sleeve 70, which are integral with the upper sleeve 65 in the direction of rotation, rotate together. As the lower sleeve 70 rotates, the mixer shaft 3 rotates together with the coupler 74.

When the mixer shaft 3 moves up and down under vibration on the blade 19 during operation, the lower sleeve 70, which is integral with the mixer shaft 3, moves up and down along the outer circumference of the upper sleeve 65, thus causing the coil spring 73 to expand and contract in the axial direction. The vibration is reduced by the coil spring 73.

This structure reduces vibration transmitted to the hands holding the left and right grips 24 and 25, thus reducing discomfort felt by the operator.

The mixer 1B according to the third embodiment includes the body 2 including the motor 6 and the spindle 16 to output the rotation of the motor 6. The mixer 1B includes the mixer shaft 3 connectable to the spindle 16 and the handle 20 attached to the body 2 and including the left and right grips 24 and 25. The mixer 1B includes the vibration isolator 40B between the mixer shaft 3 and the left and right grips 24 and 25 (between the spindle 16 and the mixer shaft 3).

In this structure, vibration generated on the mixing blade 19 is absorbed by the vibration isolator 40B and is less likely to be transmitted directly to the hands of the operator holding the left and right grips 24 and 25. This structure thus is less likely to cause lower operability due to vibration.

The vibration isolator 40B is located between the spindle 16 and the mixer shaft 3.

This structure effectively reduces vibration transmitted from the mixer shaft 3 to the body 2.

The mixer shaft 3 is connectable to the spindle 16 to be integrally rotatable and axially movable relative to the spindle 16. The vibration isolator 40B is the coil spring 73 that urges the mixer shaft 3 in a direction to be separate from the spindle 16.

This structure effectively reduces the vibration of the mixer shaft 3 in the axial direction.

The upper sleeve 65 (first sleeve) is integrally attached to the spindle 16. The lower sleeve 70 (second sleeve) spline-connected to the upper sleeve 65 is integrally attached to the mixer shaft 3. The coil spring 73 is between the upper sleeve 65 and the lower sleeve 70.

The coil spring 73 is at a position that can effectively reduce vibration.

The upper sleeve 65 includes the outer sleeve 68 (stopper member) to be engaged with the lower sleeve 70 to regulate a position to which the mixer shaft 3 protrudes in the direction to be separate from the spindle 16.

This structure can reliably regulate the range of movement of the mixer shaft 3 relative to the spindle 16.

In the third embodiment, multiple coil springs may be used. For example, two coil springs with different diameters, or a coil spring with a greater diameter and a coil spring with a smaller diameter, may be used.

The vibration isolator is not limited to such a coil spring. The vibration isolator may be a disc spring or a rubber member.

Although the lower sleeve is externally located on the upper sleeve and spline-connected to the upper sleeve in the above embodiment, the upper sleeve may be externally located on the lower sleeve and spline-connected to the lower sleeve.

The outer sleeve may be arranged on the lower sleeve.

In each of the above embodiments, the grips are not limited to the grips each including the upper and lower half parts. The grips may each include left and right half parts or three or more parts. Each grip may be an integral cylinder, without being dividable. Such grips have increased strength.

The shape of the body, the arrangement of the motor accommodated in the body, and the arrangement of the controller may be changed as appropriate.

The battery mount may not be in the upper portion of the motor housing. The battery mount may be located on a side surface or a rear surface of the motor housing.

The power supply may not be a battery. The present disclosure is also applicable to a structure in which power is supplied to the motor via a power cord from utility power (alternating current or AC power supply).

The length of the mixer shaft, the attaching structure for the mixer shaft attached to the spindle, as well as the shape of the blade are not limited to those described in the above embodiments.

Any combination of the vibration isolators in the above embodiments may be included in the mixer. For example, the vibration isolators described in the first to third embodiments may be all included in a single mixer, or any two of the vibration isolators described in the first to third embodiments may be included in a single mixer.

REFERENCE SIGNS LIST 1 mixer
2 body
3 mixer shaft
4 motor housing
5 reducer housing
6 motor
7 rotational shaft
8 controller
15 reducer
16 spindle
19 blade
20 handle
21 fixture
22 front arm
23 rear arm
24 left grip
25 right grip
26 flange
28 rubber
29, 32 screw
30 upper half part
31 lower half part
40 vibration isolator
41 insertion hole
42 screw boss
46 rubber member
47 slit
48 divided piece
49 engagement projection
50 circular portion
51, 58 protrusion
55 fastener hole
56 sleeve
57 rubber member
60 washer
65 upper sleeve
66 flange
68 outer sleeve
69 outer stopper 70 lower sleeve
72 inner stopper
73 coil spring
S space

What is claimed is:

1. A mixer, comprising:
a body including a motor and an output shaft to output rotation of the motor;
a mixer shaft connectable to the output shaft;
a handle attached to the body, the handle including
 a fixture attached to the body,
 an arm protruding from the fixture, and
 a grip attached to the arm; and
an elastic member between the arm and the grip, wherein
the arm includes a left arm and a right arm symmetric to each other with respect to the body,
the grip is located on each of the left arm and the right arm, and
the left arm protrudes outward from the grip on the left arm and includes a protective portion connecting to the elastic member at a protruding end of the left arm, and the right arm protrudes outward from the grip on the right arm and includes a protective portion connecting to the elastic member at a protruding end of the right arm.

2. The mixer according to claim 1, wherein
the grip includes two half parts dividable with the arm in between, and
the elastic member covers the arm and is held between the two half parts.

3. The mixer according to claim 2, wherein
the two half parts are joined with a screw member extending through a through-hole in the arm,
a half part of the two half parts includes a screw boss extending through the through-hole, and
the elastic member includes a protrusion extending through the screw boss and fitting in the through-hole.

4. The mixer according to claim 3, wherein
the arm is a plate,
the elastic member has a slit receiving the arm,
the slit divides the elastic member into two divided pieces in a thickness direction of the arm, and
each of the two divided pieces includes the protrusion.

5. The mixer according to claim 4, wherein
the divided pieces in the through-hole include the protrusions defining a space in the thickness direction between the protrusions.

6. A mixer, comprising:
a body including a motor and an output shaft to output rotation of the motor;
a mixer shaft connectable to the output shaft;
a handle attached to the body, the handle including
 a fixture attached to the body,
 an arm attached to the fixture, and
 a grip attached to the arm; and
an elastic member between the body and the fixture, wherein
the fixture is joined with a screw member extending through a fastener hole in the fixture, and
the elastic member is between the fixture and the screw member.

7. The mixer according to claim 6, further comprising:
a sleeve extending through the fastener hole and externally located on the screw member,
wherein the elastic member includes a protrusion fitting in the fastener hole and surrounding the sleeve.

8. A mixer, comprising:
a body including a motor and an output shaft to output rotation of the motor;
a mixer shaft connectable to the output shaft;
a handle attached to the body, the handle including a grip; and
a vibration isolator is-between the output shaft and the mixer shaft.

9. The mixer according to claim 8, wherein
the mixer shaft is connected to the output shaft to be integrally rotatable and axially movable relative to the output shaft, and
the vibration isolator includes a coil spring configured to urge the mixer shaft in a direction to be separate from the output shaft.

10. The mixer according to claim 9, further comprising:
a first sleeve integrally attached to the output shaft; and
a second sleeve spline-connected to the first sleeve and integrally attached to the mixer shaft,
wherein the coil spring is between the first sleeve and the second sleeve.

11. The mixer according to claim 10, wherein
the first sleeve includes a stopper member to be engaged with the second sleeve to regulate a position to which the mixer shaft protrudes in the direction to be separate from the output shaft.

12. The mixer according to claim 1, wherein
the grip is an integral cylinder.

* * * * *